(12) United States Patent
Kagata et al.

(10) Patent No.: US 8,292,994 B2
(45) Date of Patent: Oct. 23, 2012

(54) METHOD FOR PRODUCING WATER-REPELLENT TREATED ALUMINUM PIGMENT DISPERSION, WATER-REPELLENT TREATED ALUMINUM PIGMENT, AND AQEOUS INK COMPOSITION CONTAINING THE SAME

(75) Inventors: Takayoshi Kagata, Shiojiri (JP); Tsuyoshi Sano, Shiojiri (JP); Toshimi Fukui, Otsu (JP); Hideki Kawasaki, Ritto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/306,164

(22) Filed: Nov. 29, 2011

(65) Prior Publication Data

US 2012/0067248 A1    Mar. 22, 2012

Related U.S. Application Data

(62) Division of application No. 12/755,109, filed on Apr. 6, 2010, now Pat. No. 8,088,859.

(30) Foreign Application Priority Data

Apr. 7, 2009 (JP) ................................ 2009-092971

(51) Int. Cl.
C09D 11/00 (2006.01)
C09D 11/02 (2006.01)
C08K 3/00 (2006.01)
(52) U.S. Cl. ................. 106/31.13; 106/31.6; 106/31.65; 106/31.9; 524/441
(58) Field of Classification Search .................. 524/441; 106/31.13, 31.6, 31.65, 31.9
See application file for complete search history.

(56) References Cited

U.S. PATENT DOCUMENTS

| | | | | |
|---|---|---|---|---|
| 4,657,067 A * | 4/1987 | Rapp et al. ....................... 165/10 |
| 5,340,393 A * | 8/1994 | Jacobson ..................... 106/492 |
| 5,415,964 A * | 5/1995 | Hayashi et al. .......... 430/137.17 |
| 5,436,083 A * | 7/1995 | Haluska et al. ............... 428/688 |
| 5,436,084 A * | 7/1995 | Haluska et al. ............... 428/688 |
| 5,624,486 A | 4/1997 | Schmid et al. |
| 5,707,433 A | 1/1998 | Kuge et al. |
| 5,935,638 A * | 8/1999 | Chandra et al. ................ 427/58 |
| 6,054,220 A * | 4/2000 | Mroz ........................... 428/403 |
| 6,162,497 A * | 12/2000 | Beane et al. ................... 427/215 |
| 6,176,918 B1 | 1/2001 | Glausch et al. |
| 6,582,763 B1 * | 6/2003 | Nishimura et al. ........... 427/216 |
| 6,709,095 B2 | 3/2004 | Sago et al. |
| 6,783,222 B2 | 8/2004 | Kato et al. |
| 6,838,495 B2 * | 1/2005 | Gatti et al. ..................... 523/209 |
| 7,166,271 B2 * | 1/2007 | Zapf et al. ...................... 424/49 |
| 7,303,619 B2 | 12/2007 | Oyanagi |
| 7,622,157 B2 * | 11/2009 | Falk et al. .................. 427/407.1 |
| 7,919,032 B2 * | 4/2011 | Yamaguchi et al. .......... 264/264 |
| 2003/0083453 A1 * | 5/2003 | Lukacs et al. .................... 528/10 |
| 2005/0074611 A1 * | 4/2005 | Kuehnle et al. ............... 428/403 |
| 2005/0148685 A1 | 7/2005 | Yamamoto |
| 2005/0166795 A1 | 8/2005 | Ito et al. |
| 2005/0279255 A1 * | 12/2005 | Suzuki et al. ............. 106/287.11 |
| 2006/0167138 A1 * | 7/2006 | Ishii et al. ....................... 523/200 |
| 2008/0145628 A1 | 6/2008 | Oyanagi et al. |
| 2008/0249209 A1 | 10/2008 | Trummer et al. |
| 2008/0250970 A1 | 10/2008 | Oyanagi et al. |
| 2008/0318012 A1 | 12/2008 | Domnick et al. |
| 2009/0162750 A1 * | 6/2009 | Kawakami et al. ......... 429/218.1 |
| 2009/0264575 A1 | 10/2009 | Henglein et al. |
| 2010/0305245 A1 * | 12/2010 | Brand et al. ..................... 524/88 |

FOREIGN PATENT DOCUMENTS

| | | |
|---|---|---|
| DE | 10 2005 037 611 A1 | 2/2007 |
| EP | 2 017 310 A1 | 1/2009 |
| JP | 7-290639 | 11/1995 |
| JP | 2000-502401 A | 2/2000 |
| JP | 2001-026801 | 1/2001 |
| JP | 2003-147226 A | 5/2003 |
| JP | 2004-131542 | 4/2004 |
| JP | 2005-068250 | 3/2005 |
| JP | 2005-068251 | 3/2005 |
| JP | 2005-162771 | 6/2005 |
| JP | 2006-137864 A | 6/2006 |
| JP | 2008-174712 | 7/2008 |
| JP | 2008-201624 | 9/2008 |
| WO | 2004-035684 A2 | 4/2004 |
| WO | 2005/063897 A2 | 7/2005 |
| WO | 2007/045452 A2 | 4/2007 |

OTHER PUBLICATIONS

English Abstract of Japanese Application 2005-162771 Published Jun. 23, 2005.
English Abstract of Japanese Application 2008-201624 Published Sep. 4, 2008.
English Abstract of Japanese Application 2001-026801 Published Jan. 30, 2001.
English Abstract of Japanese Application 7-290639 Published Nov. 7, 1995.
European Search Report in Respect of Counterpart EP Application No. 10159206.1.
European Search Report in Respect of Counterpart EP Application No. 10159208.7.
English Abstract of Japanese Application No. 2008-174712 Published Jul. 31, 2008.
English Abstract of Japanese Application No. 2005-068250 Published Mar. 17, 2005.
English Abstract of Japanese Application No. 2005-068251 Published Mar. 17, 2005.
Li, et al., Aluminum Pigments Encapsulated by Inorganic-Organic Hybrid Coatings and Their Stability in Alkaline Aqueous Media, J. Coat. Technol. Res., 5(1)77-83, 2008.
BASF Pigment Disperser MD 20 Technical Information (Jul. 2003).

* cited by examiner

*Primary Examiner* — Robert S Loewe
(74) *Attorney, Agent, or Firm* — Ladas & Parry LLP

(57) ABSTRACT

A method for producing water-repellent treated aluminum pigment dispersion includes (a) adding a polysilazane solution in which a polysilazane is dissolved in a second organic solvent to an aluminum pigment dispersion in which an aluminum pigment is dispersed in a first organic solvent for reacting a hydroxyl group present on the surface of the aluminum pigment with the polysilazane to form a covering film on the surface of the aluminum pigment. The amount of the polysilazane in the reaction system for forming the covering film is 0.4 parts by mass or less based on 1 part by mass of the aluminum pigment, and the total addition amount of the polysilazane is from 0.2 to 0.6 parts by mass based on 1 part by mass of the aluminum pigment.

2 Claims, No Drawings

METHOD FOR PRODUCING WATER-REPELLENT TREATED ALUMINUM PIGMENT DISPERSION, WATER-REPELLENT TREATED ALUMINUM PIGMENT, AND AQEOUS INK COMPOSITION CONTAINING THE SAME

CROSS-REFERENCE TO RELATED APPLICATION

This application is a Divisional of application Ser. No. 12/755,109 filed Apr. 6, 2010, now U.S. Pat. No. 8,088,859 which claims the benefit of Japan Application No. 2009-092971 filed Apr. 7, 2009 the content of which is incorporated herein by reference.

BACKGROUND

1. Technical Field

The present invention relates to a method for producing water-repellent treated aluminum pigment dispersion, a water-repellent treated aluminum pigment, and an aqueous ink composition containing the pigment.

2. Related Art

As a method for forming a coating having metallic gloss on a printed matter, it has been employed, for example, foil stamping printing using a printing ink including a gold or silver powder made from, for example, brass or aluminum fine particles or metallic foil, or a thermal transfer system using metallic foil.

Recently, there have been many applications of ink jet technology to printing. Metallic printing is one of such applications, and ink having metallic gloss has been being developed. For example, JP-A-2008-174712 discloses an aluminum pigment dispersion containing an organic solvent such as alkylene glycol as a base material and discloses a non-aqueous ink composition containing the dispersion.

At the same time, it is the current status that aqueous ink compositions are required to be developed, rather than non-aqueous ink composition containing organic solvents as base materials, from the viewpoints of global environment and safety for the human body.

However, an aluminum pigment has a problem that the pigment dispersed in water reacts with water to generate hydrogen gas and also form alumina, resulting in whitening to impair the metallic gloss. Therefore, the base material of an ink composition containing an aluminum pigment must be an organic solvent hardly containing water.

SUMMARY

An advantage of some aspects of the invention is to provide a method for producing water-repellent treated aluminum pigment dispersion that is prevented from being whitened when it is blended with an aqueous paint or an aqueous ink and is excellent in water dispersibility and metallic gloss.

The method for producing water-repellent treated aluminum pigment dispersion according to the invention includes a step (a) of adding a polysilazane solution in which a polysilazane is dissolved in a second organic solvent to an aluminum pigment dispersion in which an aluminum pigment is dispersed in a first organic solvent for reacting a hydroxyl group present on the surface of the aluminum pigment with the polysilazane to form a covering film on the surface of the aluminum pigment, wherein the amount of the polysilazane in the reaction system for forming the covering film is 0.4 parts by mass or less based on 1 part by mass of the aluminum pigment, and the total addition amount of the polysilazane is from 0.2 to 0.6 parts by mass based on 1 part by mass of the aluminum pigment.

In the method for producing water-repellent treated aluminum pigment dispersion according to the invention, in the step (a), the polysilazane solution may be added in divided portions.

The method for producing water-repellent treated aluminum pigment dispersion according to the invention may further include, after the step (a), a step (b) of forming a densified film by densifying the covering film by adding water.

In the method for producing water-repellent treated aluminum pigment dispersion according to the invention, in the step (b), a mixture solution of water and a third organic solvent may be used instead of the water.

In the method for producing water-repellent treated aluminum pigment dispersion according to the invention, in the step (b), the water or the mixture solution of water and a third organic solvent may be added in divided portions.

In the method for producing water-repellent treated aluminum pigment dispersion according to the invention, the aluminum pigment may be a plate-like particle having an average thickness of from 5 to 30 nm and a 50% mean particle diameter of from 0.5 to 3

In the method for producing water-repellent treated aluminum pigment dispersion according to the invention, the covering film may have a thickness of from 0.5 to 10 nm.

In the method for producing water-repellent treated aluminum pigment dispersion according to the invention, the first organic solvent may contain diethylene glycol diethyl ether.

In the method for producing water-repellent treated aluminum pigment dispersion according to the invention, the first organic solvent may further contain at least one selected from tetrahydrofuran and methyl ethyl ketone.

In the method for producing water-repellent treated aluminum pigment dispersion according to the invention, the second organic solvent may contain xylene.

In the method for producing water-repellent treated aluminum pigment dispersion according to the invention, the second organic solvent may further contain at least one selected from tetrahydrofuran and methyl ethyl ketone.

In the method for producing water-repellent treated aluminum pigment dispersion according to the invention, the third organic solvent may contain at least one selected from tetrahydrofuran and methyl ethyl ketone.

The aqueous ink composition according to the invention contains a water-repellent treated aluminum pigment dispersion produced by the above-described method for producing water-repellent treated aluminum pigment dispersion.

The water-repellent treated aluminum pigment according to the invention is a water-repellent treated aluminum pigment in which a covering film containing at least Si is formed on the surface of an aluminum pigment having an average thickness of from 5 to 30 nm and a 50% mean particle diameter of from 0.5 to 3 µm, wherein the aluminum pigment surface coverage ratio by the covering film is from 20 to 90% when it is calculated from the composition ratios of C, O, Al, and Si that are detected by XPS at an incident angle of 30°.

In the water-repellent treated aluminum pigment according to the invention, the covering film has a thickness of from 0.5 to 10 nm.

DESCRIPTION OF EXEMPLARY EMBODIMENTS

Preferred embodiments of the invention will be described in detail below, but the invention is not limited thereto.

1. Method for Producing Water-repellent Treated Aluminum Pigment Dispersion

A method for producing water-repellent treated aluminum pigment dispersion according to an embodiment of the invention includes a step (a) of adding a polysilazane solution in which a polysilazane is dissolved in a second organic solvent to an aluminum pigment dispersion in which an aluminum pigment is dispersed in a first organic solvent for reacting a hydroxyl group present on the surface of the aluminum pigment with the polysilazane to form a covering film on the surface of the aluminum pigment, wherein the amount of the polysilazane in the reaction system for forming the covering film is 0.4 parts by mass or less based on 1 part by mass of the aluminum pigment, and the total addition amount of the polysilazane is from 0.2 to 0.6 parts by mass based on 1 part by mass of the aluminum pigment (hereinafter also simply referred to as "step (a)").

An example of the method for producing water-repellent treated aluminum pigment dispersion according to the embodiment will be described below.

1.1 Step (a)

First, the aluminum pigment dispersion in which an aluminum pigment is dispersed in a first organic solvent is prepared by the following steps (1) and (2).

(1) A composite pigment base substrate having a structure in which a peeling resin layer and an aluminum or aluminum alloy layer (hereinafter simply referred to as "aluminum layer") are sequentially laminated on a sheet-like base material is prepared.

The sheet-like base material is not particularly limited, and examples thereof include polyester films such as polytetrafluoroethylene, polyethylene, polypropylene, and polyethylene terephthalate; polyamide films such as Nylon 66 and Nylon 6; and mold-releasing films such as polycarbonate films, triacetate films, and polyimide films. Among them, polyethylene terephthalate and copolymers thereof are preferred.

The thickness of the sheet-like base material is not particularly limited, but is preferably from 10 to 150 µm. A thickness of 10 µm or more does not cause problems in handling during a processing step or the like, and a thickness of 150 µm or less imparts high flexibility and does not cause problems in, for example, rolling and peeling.

The peeling resin layer is an undercoat layer for the aluminum layer and serves as a peelable layer for improving the peelability from the sheet-like base material surface. Preferred examples of the resin used for the peeling resin layer include polyvinyl alcohol, polyvinyl butyral, polyethylene glycol, polyacrylic acid, polyacrylamide, cellulose derivatives, acrylic acid polymers, and denatured nylon resins.

The peeling resin layer can be formed by applying a solution of a mixture of one or more of the above-mentioned resins to a sheet-like base material, followed by drying. The application solution may contain an additive such as a viscosity modifier.

The application of the peeling resin layer can be performed by a known technology such as gravure coating, roll coating, blade coating, extrusion coating, dip coating, or spin coating that is usually used. After the application and drying, if necessary, the surface may be smoothed by calender treatment.

The thickness of the peeling resin layer is not particularly limited, but is preferably from 0.5 to 50 µm and more preferably from 1 to 10 µm. A thickness of smaller than 0.5 µm is an insufficient amount as a dispersion resin. A thickness larger than 50 µm tends to cause peeling at the interface with the pigment layer when rolled.

The aluminum layer is preferably deposited by vacuum deposition, ion plating, or sputtering.

The aluminum layer may be disposed between protection layers as described in JP-A-2005-68250. Examples of the protection layers include silicon oxide layers and resin protection layers.

The silicon oxide layer is not particularly limited as long as the layer contains silicon oxide, but is preferably formed of an silicon alkoxide such as tetraalkoxysilane or a polymer thereof by a sol-gel method. The silicon oxide layer is formed as a coating film by applying an alcohol solution dissolving silicon alkoxide or a polymer thereof, followed by heating and baking.

The protection resin layer is not particularly limited as long as the layer is made of a resin not being dissolved in a dispersion medium. Examples of the resin include polyvinyl alcohol, polyethylene glycol, polyacrylic acid, polyacrylamide, and cellulose derivatives. Among them, the layer is preferably formed of polyvinyl alcohol or a cellulose derivative.

The protection resin layer can be formed by applying an aqueous solution of a mixture of one or more of the above-mentioned resins, followed by drying. The application solution may contain an additive such as a viscosity modifier. The application of silicon oxide and a resin can be performed by the same method as in the application of the peeling resin layer.

The thickness of the protection layer is not particularly limited, but is preferably in the range of from 50 to 150 nm. A thickness of smaller than 50 nm causes insufficient mechanical strength, but a thickness of larger than 150 nm causes difficulties in pulverization and dispersion due to too high strength and further may cause peeling at the interface with the aluminum layer.

Furthermore, a color material layer may be provided between the "protection layer" and the "aluminum layer", as described in JP-A-2005-68251.

The color material layer is provided for obtaining an intended colored composite pigment and is not particularly limited as long as it can contain a color material that can impart intended tone and hue to the aluminum pigment used in the embodiment, in addition to the metallic gloss, brilliance, and background-covering ability. The color material used in the color material layer may be either a dye or a pigment, and known dyes and pigments can be arbitrarily used.

The "pigment" used in the color material layer in this case refers to those defined in the field of general engineering, such as natural pigments, synthetic organic pigments, and synthetic inorganic pigments.

The formation method of the color material layer is not particularly limited, but is preferably formed by coating. When the color material used in the color material layer is a pigment, it is preferable that the layer further contain a color material-dispersing resin. The color material layer containing a color material-dispersing resin is preferably formed as a thin resin film by spin-coating a solution dispersing or dissolving the pigment, the color material-dispersing resin, and, according to need, other additives in a solvent to form a uniform liquid film and drying it. In addition, in the production of the composite pigment base substrate, it is preferable from the standpoint of work efficiency that both the color material layer and the protection layer be formed by coating.

The composite pigment base substrate may have a layer configuration having a plurality of structures in which the peeling resin layer and the aluminum layer are sequentially laminated. In such a case, the total thickness of the laminar structure composed of a plurality of aluminum layers, that is, the thickness of (aluminum layer/peeling resin layer/aluminum layer) or (peeling resin layer/aluminum layer), excluding the sheet-like base material and the peeling resin layer directly disposed thereon, is preferably 5000 nm or less. A thickness not larger than 5000 nm hardly causes cracking and peeling in the composite pigment base substrate even when it is rolled and thus provides excellent storage properties. In addition, after being formed into a pigment, the excellent metallic gloss is still maintained, which is preferred. Furthermore, the peeling resin layer and the aluminum layer may be laminated alternately on each of both surfaces of the sheet-like base material, but the configuration is not limited to these structures.

(2) Then, an aluminum pigment dispersion containing coarse particles is prepared by peeling the aluminum layer from the composite pigment base substrate at the interface between the sheet-like base material and the peeling resin layer of the composite pigment base substrate in the first organic solvent, and pulverizing or microparticulating the aluminum layer. Furthermore, the resulting aluminum pigment dispersion is subjected to filtration for removing the coarse particles to obtain an aluminum pigment dispersion containing plate-like aluminum particles.

The first organic solvent may be one that does not impair the dispersion stability of the aluminum pigment and the reactivity with the polysilazane and is preferably a polar organic solvent. Examples of the polar organic solvent include alcohols (for example, methyl alcohol, ethyl alcohol, propyl alcohol, butyl alcohol, isopropyl alcohol, and fluorinated alcohols), ketones (for example, acetone, methyl ethyl ketone, and cyclohexanone), carboxylic acid esters (for example, methyl acetate, ethyl acetate, propyl acetate, butyl acetate, methyl propionate, and ethyl propionate), and ethers (for example, diethyl ether, dipropyl ether, tetrahydrofuran, and dioxane).

Among the polar organic solvents mentioned above, tetrahydrofuran, methyl ethyl ketone, alkylene glycol monoether, and alkylene glycol diether that are liquids at ordinary temperature and pressure are more preferred.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Among them, from the viewpoint of being excellent in dispersion stability of the aluminum pigment, triethylene glycol monobutyl ether and diethylene glycol diethyl ether are more preferred, and diethylene glycol diethyl ether is particularly preferred.

In addition, from the viewpoints of being excellent in compatibility with the below-described polysilazane and not having a hydroxyl group that reacts with a polysilazane, tetrahydrofuran and methyl ethyl ketone are preferred.

The aluminum pigment dispersion prepared by dispersing the pigment in the first organic solvent as described above may be further diluted to a predetermined concentration with any of the above-mentioned first organic solvents.

As the first organic solvent, the above-mentioned organic solvents can be used alone or as a mixture of two or more thereof.

The peeling method from the sheet-like base material is not particularly limited. Preferred is a method in which the composite pigment base substrate is immersed in a liquid for peeling or a method in which the composite pigment base substrate is immersed in a liquid and is simultaneously sonicated for performing peeling and pulverization of the peeled composite pigment at the same time.

In the thus obtained aluminum pigment composed of plate-like particles, the peeling resin layer functions as protective colloid, and thereby a stable dispersion can be obtained by only performing dispersion treatment in a solvent. In an ink composition containing the aluminum pigment, the resin derived from the peeling resin layer also can have a function of providing adhesion against a recording medium.

It is preferable that the aluminum pigment in the aluminum pigment dispersion prepared through the process described above have a plate-like particle shape from the viewpoints of providing satisfactory water repellency and metallic gloss.

Here, the term "plate-like particle" refers a particle having an approximately flat surface (X-Y plane) and an approximately uniform thickness (Z), when the major axis and the minor axis of the flat surface and the thickness of the aluminum particle are denoted as X, Y, and Z, respectively. More specifically, it refers to a particle that satisfies the requirements that the 50% mean particle diameter R50 (hereinafter also simply referred to as "R50") based on circle-equivalent diameters determined from the approximately flat surface (X-Y plane) areas of the aluminum particles is from 0.5 to 3 µm and the thickness (Z) is from 5 to 30 nm.

The term "circle-equivalent diameter" refers to the diameter of a circle that has the same projected area as that of the approximately flat surface (X-Y plane) of the aluminum particle. For example, when the approximately flat surface (X-Y plane) of the aluminum particle is a polygon, the diameter of a circle that is obtained by converting the projected image of the polygon so as to have the same area as that of the polygon is the circle-equivalent diameter of the aluminum particle.

The 50% mean particle diameter R50 based on circle-equivalent diameters determined from the approximately flat surface (X-Y plane) areas of the plate-like particles is preferably from 0.5 to 3 µm and more preferably from 0.75 to 2 µm, from the viewpoints of satisfactory metallic gloss and printing stability. When the R50 is smaller than 0.5 µm, the metallic gloss may be insufficient. On the other hand, when the R50 is larger than 3 µm, the printing stability may be decreased.

The maximum particle diameter based on circle-equivalent diameters determined from the approximately flat surface (X-Y plane) areas of the plate-like particles is preferably 10 µm or less. By regulating the maximum particle diameter to 10 µm or less, clogging of the plate-like particles in, for example, the nozzle of an ink jet recording apparatus and the foreign matter-removing filter disposed in an ink channel can be prevented.

The major axis X, the minor axis Y, and the circle-equivalent diameter of the flat surface of the plate-like particle can be measured with a particle image analyzer. Examples of the particle image analyzer include flow particle image analyzers, FPIA-2100, FPIA-3000, and FPIA-3000S (these are manufactured by Sysmex Corp.).

The particle size distribution (CV value) of the plate-like particles can be determined by the following equation (1):

CV value={(standard deviation of particle distribution)/(average particle diameter)}×100    (1).

Here, the resulting CV value is preferably 60 or less, more preferably 50 or less, and most preferably 40 or less. By selecting particles having a CV value of 60 or less, an advantageous effect, excellent printing stability, can be achieved.

The thickness (Z) is preferably from 5 to 30 nm and more preferably from 10 to 25 nm, from the viewpoint of ensuring metallic gloss. When the thickness (Z) is smaller than 5 nm, the metallic gloss tends to be decreased when the covering film is formed on the surface of the aluminum particle. Also when the thickness (Z) is larger than 30 nm, the metallic gloss tends to be decreased.

The aluminum pigment is preferably made of aluminum or an aluminum alloy, from the viewpoints of cost performance and ensuring metallic gloss. When an aluminum alloy is used, examples of a metallic element or a nonmetallic element that is added to the alloy, other than aluminum, include silver, gold, platinum, nickel, chromium, tin, zinc, indium, titanium, and copper.

(3) Then, a polysilazane solution is prepared by adding a polysilazane in a second organic solvent and stirring them.

In the method for producing water-repellent treated aluminum pigment dispersion according to the embodiment, the term "second organic solvent" refers to an organic solvent used for dissolving and diluting the polysilazane. Since the second organic solvent can dissolve and dilute the polysilazane, the handling of the polysilazane is made easy.

The second organic solvent is not particularly limited as long as it can dissolve a polysilazane and make the handling of the polysilazane easy and also does not have a hydroxyl group that reacts with the polysilazane, and preferred examples thereof include aliphatic hydrocarbons such as pentane, hexane, heptane, octane, and cyclohexane; aromatic hydrocarbons such as toluene, xylene, and naphthalene; ethers such as diethyl ether, dipropyl ether, dibutyl ether, tetrahydrofuran, and tetrahydropyrane; and ketones such as acetone and methyl ethyl ketone.

Among them, from the viewpoint of being arbitrarily mixed with the first organic solvent, xylene, tetrahydrofuran, and methyl ethyl ketone are more preferred. An aluminum dispersion excellent in dispersion stability can be obtained by that the first organic solvent and the second organic solvent are arbitrarily mixed with each other.

As the second organic solvent, the above-mentioned organic solvents can be used alone or as a mixture of two or more thereof.

The polysilazane is used for forming a covering film on the surface of the aluminum pigment by a reaction with the hydroxyl group present on the surface of the aluminum pigment.

Examples of the polysilazane include chain or cyclic compounds represented by the following formula (2). Among these compounds, preferred are a polysilazane in which the Si atom is bound to an alkoxyl group or the like, a polysilazane having an organic group such as an alkyl group, and a perhydropolysilazane in which all of $R_1$, $R_2$, and $R_3$ in the following formula (2) are hydrogen, and more preferred is the perhydropolysilazane, which is easily converted to silica in the below-described formation of the covering film.

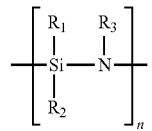

(2)

(In the formula, $R_1$, $R_2$, and $R_3$ each independently represent hydrogen, an organic group, or an organic metal group; and n is an integer of from 1 to 30.)

The concentration of the polysilazane in the polysilazane solution is preferably from 1 to 30% by mass and more preferably from 2 to 20% by mass based on the total mass of the polysilazane solution.

If the concentration of the polysilazane is higher than the above-mentioned range, aggregation occurs among the polysilazanes when the polysilazane solution is added to the aluminum pigment dispersion as described below, and thereby the formation of the covering film of the polysilazane on the surface of the aluminum pigment may become insufficient. In addition, the dispersibility of the aluminum pigment dispersion may be deteriorated by that the aluminum pigment is taken into the aggregation product of the polysilazane.

(4) Then, the polysilazane solution is added to the aluminum pigment dispersion, followed by stirring. By doing so, it is possible to form a covering film on the surface of the aluminum pigment by a hydrolysis reaction between the hydroxyl group present on the surface of the aluminum pigment and the polysilazane.

When an aluminum pigment is dispersed in water, hydrogen gas is generated and the generation of alumina causes whitening of the aluminum pigment dispersion. Therefore, the oxidation is avoided by covering the surface of the aluminum pigment with a covering film to prevent disappearance of metallic gloss of the aluminum pigment.

The reaction in which the covering film is formed on the surface of the aluminum pigment is assumed to be performed as follows. First, a nitrogen atom of the silazane bond is eliminated by a hydrolysis reaction of the polysilazane, with formation of a silanol bond by addition of a hydroxyl group. In addition, the eliminated nitrogen atom generates ammonia gas. Then, a covering film having siloxane bond is formed on the entire or a part of the surface of the aluminum pigment by a condensation reaction between the silanol group and the hydroxyl group present on the surface of the aluminum pigment and further a dehydropolymerization reaction among the silanol groups. Note that the silazane group may remain in the covering film.

The polysilazane solution may be added in divided portions. By adding the aluminum pigment in divided portions, formation of independent polysilazane particles can be avoided to give an aluminum pigment dispersion excellent in dispersion stability.

The dispersibility of the aluminum pigment dispersion is deteriorated by the formation of independent polysilazane particles. If the polysilazane concentration in the reaction system for forming the covering film on the surface of the aluminum pigment is sharply increased, independent polysilazane particles are formed, and the aluminum pigment is taken into the polysilazane. It is assumed that the dispersibility of the aluminum pigment dispersion is deteriorated by aggregation among the polysilazane particles thus taking the aluminum pigment therein.

The amount of the polysilazane in the reaction system is 0.4 parts by mass or less, preferably from 0.04 to 0.4 parts by mass, and more preferably from 0.04 to 0.32 parts by mass based on 1 part by mass of the aluminum pigment. When the amount of the polysilazane in the reaction system is larger than the above-mentioned range, the polysilazane concentration in the reaction system is sharply increased. As a result, independent polysilazane particles may be formed, or dispersibility of the aluminum pigment dispersion may be deteriorated.

The total addition amount of the polysilazane may be determined by calculating the amount such that the thickness of the covering film is from 0.5 to 10 nm, preferably 5 nm. This is because that the metallic gloss may be decreased when the thickness of the aluminum pigment after the hydrolysis reaction is larger than 30 nm.

The total addition amount of the polysilazane is preferably from 0.2 to 0.6 parts by mass and more preferably from 0.3 to 0.5 parts by mass based on 1 part by mass of the aluminum pigment. When the total addition amount of the polysilazane is smaller than the above-mentioned range, the hydroxyl group present on the surface of the aluminum pigment cannot be completely covered, and thereby the water repellency may be insufficient. On the other hand, when the total addition amount of the polysilazane is larger than the above-mentioned range, the thickness of the covering film for the aluminum pigment is large, and thereby the metallic gloss may be decreased.

The reaction temperature for the hydrolysis reaction is preferably from 10 to 90° C. and more preferably from 20 to 70° C. When the temperature is lower than 10° C., the hydrolysis rate is slow, which tends to make the formation of the covering film on the surface of the aluminum pigment insufficient. When the temperature is higher than 90° C., it is necessary to pay particular attention from the standpoint of safety.

The reaction time for the hydrolysis reaction is preferably from 0.5 to 100 hours and more preferably from 1 to 80 hours. When the reaction time is shorter than 0.5 hours, the hydrolysis reaction may not be completely achieved, and thereby the water repellency and water dispersibility may be insufficient. When the reaction time is longer than 100 hours, the aluminum pigment may aggregate.

The pH of the reaction system may be any of acidic, neutral, or alkaline.

1.2 Step (b)

After the step (a), a step (b) of densifying the covering film (hereinafter also simply referred to as "step (b)") may be further conducted. By densifying the covering film, water is prevented from infiltrating to the surface of the aluminum pigment. Thus, water repellency can be provided.

The densification of the covering film is performed by, for example, addition of water and subsequent stirring. The reaction caused by the addition of water is a hydrolysis reaction. Specifically, the silazane bond remaining in the covering film is converted to a siloxane bond by adding water, and thereby the covering film can be densified.

The addition of water is preferably conducted after the addition of the polysilazane solution, and more preferably after the termination of the reaction for forming the covering film. This is because that when water is added before the formation of the covering film, aggregation of the polysilazane or whitening of the aluminum pigment dispersion may occur.

Furthermore, water may be added in divided portions. By adding water in divided portions, aggregation among the silazane groups remaining in the covering film can be avoided to give an aluminum pigment dispersion excellent in dispersion stability.

It is assumed that the dispersibility of the aluminum pigment dispersion is deteriorated by aggregation occurring among the silazane groups that remain in the covering film, when the water concentration in the reaction system for densifying the covering film is sharply increased.

The water is preferably pure water or ultrapure water such as ion-exchanged water, ultrafiltration water, reverse osmosis water, or distilled water.

The amount of water in the reaction system for densifying the covering film is preferably 5 parts by mass or less, more preferably from 0.05 to 5 parts by mass, and more preferably from 0.1 to 2 parts by mass based on 1 part by mass of the aluminum pigment. When the amount of water in the reaction system for densifying the covering film is larger than the above-mentioned range, the water concentration is sharply increased, and thereby the silazane groups remaining in the covering film may aggregate, or the dispersibility of the aluminum pigment dispersion may be deteriorated.

The total addition amount of water is preferably 10 parts by mass or less, more preferably from 0.1 to 8 parts by mass, and further preferably from 0.2 to 5 parts by mass based on 1 part by mass of the aluminum pigment.

The reaction temperature in the reaction for densifying the covering film is preferably from 10 to 90° C., more preferably, from 20 to 70° C. When the temperature is lower than 10° C., the reaction rate is slow to cause poor densification of the covering film. When the temperature is higher than 90° C., it is necessary to pay particular attention from the standpoint of safety.

The reaction time in the reaction for densifying the covering film is preferably from 0.5 to 100 hours, more preferably, from 1 to 80 hours. When the reaction time is shorter than the range, the reaction may not be sufficiently achieved.

As the method for densifying the covering film, a mixture solution of water and a third organic solvent may be used instead of water. The mixture solution of water and the third organic solvent can accomplish the function of diluting the water. Therefore, a sharp increase in water concentration can be avoided when water and the third organic solvent are added to the aluminum pigment dispersion.

As the third organic solvent, the organic solvents exemplified as the second organic solvent can be used.

In addition, since the added water can be uniformly distributed in the aluminum pigment dispersion, it is preferable to use the same organic solvent as the second organic solvent.

The amount of the organic solvent used for densifying the covering film is preferably from 1 to 15 parts by mass and more preferably from 5 to 10 parts by mass based on 1 part by mass of the water.

1.3 Step (c)

After each of the steps, a step (c) of removing at least part of the organic solvent and then adding a surfactant aqueous solution for solvent substitution (hereinafter also simply referred to as "step (c)") may be conducted. By conducting the step (c), the organic solvent in the aluminum pigment dispersion prepared in each step above can be substituted by an aqueous solvent, and thereby an aluminum pigment dispersion excellent in water dispersibility and water repellency can be provided. Since the solvent of the aluminum pigment dispersion prepared by the step (c) is an aqueous solvent, the aluminum pigment dispersion can be easily applied to an aqueous ink composition.

First, the organic solvent contained in the aluminum pigment dispersion is removed by separating the aluminum pigment provided with the covering film from the organic solvent by, for example, filtration, centrifugal sedimentation, or centrifugation of the aluminum pigment dispersion. The operation of centrifugation is simple and is therefore preferably used for removing the organic solvent. These methods preferably remove at least 70% of the organic solvent contained in the aluminum pigment dispersion.

Then, a surfactant aqueous solution in which water is dissolved in a surfactant is added, followed by stirring. As the surfactant, an anionic surfactant, a cationic surfactant, a nonionic surfactant, an amphoteric surfactant, or a polymer surfactant can be used.

Examples of the anionic surfactant include aliphatic acids such as higher fatty acid salts and α-sulfo fatty acid methyl esters; straight-chain alkyl benzenes such as straight-chain alkyl benzene sulfonates; higher alcohols such as alkyl sulfate esters, alkyl ether sulfate esters, alkyl phosphate esters, and dioctyl sulfosuccinates; α-olefin such as α-olefin sulfonate; and normal paraffins such as alkane sulfonates, but the anionic surfactant is not limited thereto.

Examples of the cationic surfactant include quaternary ammoniums such as alkyl trimethyl ammonium salts, dialkyl dimethyl ammonium salts, and alkyl dimethylbenzyl ammonium salts; and amine salts such as N-methyl bis(hydroxyethyl)amine fatty acid esters, but the cationic surfactant is not limited thereto.

Examples of the nonionic surfactant include fatty acids such as sucrose fatty acid esters, sorbitan fatty acid esters, polyoxyethylene sorbitan fatty acid esters, polyoxyethylene fatty acid esters, and fatty acid alkanol amides; and alkyl phenols such as polyoxyethylene alkyl ethers, alkyl glycosides, and polyoxyethylene alkyl phenyl ethers, but the nonionic surfactant is not limited thereto.

Examples of the amphoteric surfactant include amino acids such as alkyl amino fatty acid salts; and betaines such as alkyl carboxyl betaines; and amine oxides such as alkyl amine oxides, but the amphoteric surfactant is not limited thereto.

Examples of the polymer surfactant include polycarboxylic acids, naphthalenes, melamines, and aminosulfonic acids. Examples of the polycarboxylic acid surfactant include polyacrylic acid, polymethacrylic acid, polymaleic acid, polymaleic acid anhydride, maleic acid or maleic acid anhydride/ olefin copolymers (for example, isobutylene and diisobutylene), acrylic acid/itaconic acid copolymers, methacrylic acid/itaconic acid copolymers, maleic acid or maleic acid anhydride/styrene copolymers, acrylic acid/methacrylic acid copolymers, acrylic acid/acrylic acid methyl ester copolymers, acrylic acid/vinyl acetate copolymers, acrylic acid/maleic acid or maleic acid anhydride copolymers, and their alkali metal salts, alkaline earth metal salts, ammonium salts, and amine salts.

Among them, preferred are polycarboxylic acid surfactants, more preferred are maleic acid anhydride/styrene copolymers and maleic acid anhydride/olefin copolymer sodium salts, and particularly preferred are maleic acid anhydride/olefin copolymer sodium salts. The polycarboxylic acid surfactant can effectively inhibit aggregation among aluminum pigments by steric hindrance effect thereof, after adsorption to the surfaces of the aluminum pigments.

The weight-average molecular weight of the maleic acid anhydride/olefin copolymer sodium salt is preferably from 2000 to 500000 and more preferably from 10000 to 100000. When the weight-average molecular weight of the maleic acid anhydride/olefin copolymer sodium salt is higher than the range, the viscosity of the aluminum pigment dispersion is increased, and thereby the dispersibility is deteriorated. On the other hand, when the weight-average molecular weight of the maleic acid anhydride/olefin copolymer sodium salt is smaller than the range, the steric hindrance effect of the surfactant cannot be expected, and thereby the dispersibility of the aluminum pigment is deteriorated. Examples of the maleic acid anhydride/olefin copolymer sodium salt include Polystar OM (trade name of NOF Corp., pH: 10.0 to 12.0).

The weight-average molecular weight of the maleic acid anhydride/styrene copolymer is preferably from 2000 to 500000 and more preferably from 10000 to 100000. When the weight-average molecular weight of the maleic acid anhydride/styrene copolymer is higher than the range, the viscosity of the aluminum pigment dispersion is increased, and thereby the dispersibility is deteriorated. On the other hand, when the weight-average molecular weight of the maleic acid anhydride/styrene copolymer is smaller than the range, the steric hindrance effect of the surfactant cannot be expected, and thereby the dispersibility of the aluminum pigment is deteriorated. Examples of the maleic acid anhydride/styrene copolymer include Malialim AKM-0531 (trade name of NOF Corp., pH: 2.3 to 5.5).

The weight-average molecular weight can be determined by, for example, gel permeation chromatography (GPC) using tetrahydrofuran as a solvent, in terms of polystyrene molecular weight.

The addition amount of the surfactant is preferably from 0.02 to 1.5 parts by mass based on 1 part by mass of the aluminum pigment. When the addition amount of the surfactant is larger than the range, the dispersibility of the aluminum pigment may be deteriorated. On the other hand, when the addition amount of the surfactant is smaller than the range, aggregation of the aluminum pigment occurs, and thereby the metallic gloss cannot be maintained.

The surfactant aqueous solution is preferably added in an amount of 70% by mass or more based on the total mass of the aluminum pigment dispersion.

2. Water-Repellent Treated Aluminum Pigment

The water-repellent treated aluminum pigment according to the embodiment is obtained through the above-described production process. In the water-repellent treated aluminum pigment, a covering film containing at least Si is formed on the surface of an aluminum pigment having an average thickness of from 5 to 30 nm and a 50% mean particle diameter of from 0.5 to 3 μm. When the aluminum pigment has an average thickness of from 5 to 30 nm, the water-repellent treated aluminum pigment can have excellent metallic gloss. When the average thickness is smaller than 5 nm, the metallic gloss tends to decrease, and also when the average is larger than 30 nm, the metallic gloss tends to decrease.

The thickness of the covering film is preferably from 2 to 10 nm and more preferably from 3 to 9 nm. When the thickness of the covering film is smaller than 2 nm, the water repellency and the water dispersibility of the aluminum pigment are insufficient. On the other hand, the thickness of the covering film is larger than 10 nm, the metallic gloss tends to be decreased though the water repellency and water dispersibility can be imparted to the aluminum pigment.

The aluminum pigment surface coverage ratio by the covering film is calculated from the composition ratios of C, O, Al, and Si elements that are measured by an X-ray photoemission spectroscope (hereinafter referred to as "XPS") at an X-ray irradiation angle of 30°. When the X-ray irradiation angle is θ, since the measurement depth is proportional to sin θ, it is thought that a larger amount of surface information can be obtained by decreasing the irradiation angle of the X-ray as much as possible. Accordingly, the X-ray irradiation angle is determined to be 30°.

A method for determining the aluminum pigment surface coverage ratio by the covering film, which is based on the composition ratios of C, O, Al, and Si elements measured by an XPS at an X-ray irradiation angle of 30°, will be described below.

The composition ratios of C, O, Al, and Si elements obtained from XPS measurement are imputed to the following.

(1) Al

The composition ratio of Al is imputed to simple Al (Al) not bonded to oxygen and Al ($Al_O$) bonded to oxygen. The ratio of the simple Al (Al) not bonded to oxygen and the Al ($Al_O$) bonded to oxygen can be determined by separating peaks of an Al-2p spectrum and based on the area ratio of the peaks.

(2) Si

The composition ratio of Si is imputed to Si ($Si_1$) derived from the polysilazane.

(3) O

The composition ratio of O is imputed to O ($O_0$) bonded to Al and O ($O_1$) bonded to Si.

(4) C

All of carbon detected is from the organic solvent, the surfactant, and so on and thereby can be recognized as not being involved in the formation of the covering film.

Based on the above-mentioned element imputation, the aluminum pigment surface coverage ratio by the covering film can be determined by the following equation (3):

$$\text{Coverage ratio}(\%) = \frac{(Si_1 + O_1)}{(Si_1 + O_1) + (Al) + (Al_0 + O_0)} \times 100 \quad (3)$$

The coverage ratio of the water-repellent treated aluminum pigment according to the embodiment by the covering film, calculated by the equation (3), is from 20 to 90% and more preferably 30 to 60%. When the coverage ratio is within such a range, water repellency can be imparted to the aluminum pigment, and thereby whitening does not occur even when the pigment is dispersed in water. When the coverage ratio is smaller than 20%, the aluminum pigment may whitens due to insufficient water repellency and also may aggregate to cause blackening due to insufficient water dispersibility. On the other hand, when the coverage ratio is larger than 90%, it involves technical difficulty.

3. Aqueous Ink Composition

The aqueous ink composition according to the embodiment contains an aluminum pigment dispersion produced by the above-described method for producing water-repellent treated aluminum pigment dispersion. In the specification, the term "aqueous ink composition" refers to an ink composition containing 70% by mass or more of water as a solvent. The water is preferably pure water or ultrapure water such as ion-exchanged water, ultrafiltered water, reverse osmosis water, or distilled water. In particular, by sterilizing such water by, for example, ultraviolet irradiation or hydrogen peroxide addition, the water can be prevented from occurrence of molds or bacteria for a long period of time and therefore is preferred.

The concentration of the aluminum pigment in the aqueous ink composition according to the embodiment is preferably from 0.1 to 3.0% by mass, more preferably from 0.25 to 2.5% by mass, and most preferably from 0.5 to 2.0% by mass based on the total mass of the aqueous ink composition.

The aqueous ink composition according to the embodiment may further contain, for example, an organic solvent, a resin, a surfactant, a polyol, an antioxidant, an ultraviolet absorber, or a pH adjuster, according to need.

The aqueous ink composition according to the embodiment preferably has a viscosity of from 2 to 10 mPa·s and more preferably from 3 to 5 mPa·s at 20° C. When the aqueous ink composition has a viscosity within such a range at 20° C., the composition can be further suitably applied to an ink jet recording apparatus, an appropriate amount of the composition can be discharged from a nozzle, and curved flying and scattering of the composition can be further reduced.

4. Examples 4.1 Example 1

A resin layer coating liquid composed of 3.0% by mass of cellulose acetate butyrate (degree of butylation: 35 to 39%, manufactured by Kanto Chemical Co., Inc.) and 97% by mass of diethylene glycol diethyl ether (manufactured by Nippon Nyukazai Co., Ltd.) was uniformly applied onto a PET film having a thickness of 100 μm by bar coating, followed by drying at 60° C. for 10 minutes to form a resin layer thin film on the PET film.

Then, an aluminum deposition layer having an average thickness of 20 nm was formed on the resin layer using a vacuum deposition apparatus ("VE-1010 vacuum deposition apparatus", manufactured by Vacuum Device Inc.).

Then, the laminate formed by the above-described method was simultaneously peeled, pulverized so as to be reduced in size, and dispersed in diethylene glycol diethyl ether (hereinafter also referred to as "DEGDEE" using an ultrasonic disperser model VS-150 (manufactured by As One Corp.) to prepare an aluminum pigment dispersion that has been subjected to ultrasonic dispersion treatment for 12 hours in total.

The resulting aluminum pigment dispersion was filtered through an SUS mesh filter with a pore size of 5 μm to remove coarse particles. Then, the filtrate was put in a round-bottomed flask, and DEGDEE was distilled off using a rotary evaporator. By doing so, the aluminum pigment dispersion was concentrated, and then the concentration of the aluminum pigment in the dispersion was adjusted to 5% by mass to give an aluminum pigment dispersion (hereinafter also referred to as "5% AL dispersion").

Then, a 20% by mass perhydropolysilazane solution (trade name: "Aquamica NN-110", manufactured by Clariant Japan Co., Ltd., hereinafter also referred to as "20% PS solution"), which is perhydropolysilazane dissolved in a xylene solvent, was prepared.

Then, 20 g of the 5% AL dispersion was put in a beaker, and 0.8 g of the 20% PS solution was added in the beaker, followed by stirring at room temperature for 24 hours for a hydrolysis reaction to form a covering film on the surface of the aluminum pigment.

The step of adding the 20% PS solution and stirring at room temperature for 24 hours was repeated three times.

By doing so, an aluminum pigment dispersion A containing the aluminum pigment of which surface was provided with a covering film was obtained.

4.2 Example 2

First, tetrahydrofuran (hereinafter also referred to as "THF") was added to the 5% AL dispersion prepared in "4.1 Example 1", followed by stirring to prepare a 0.5% by mass aluminum pigment dispersion (hereinafter also referred to as "0.5% AL dispersion").

Then, THF was added to the 20% PS solution, followed by stirring to prepare a 2% by mass perhydropolysilazane solution (hereinafter also referred to as "2% PS solution").

Then, 200 g of the resulting 0.5% AL dispersion was put in a beaker, and 8 g of the 2% PS solution was added in the beaker, followed by stirring at room temperature for 24 hours for a hydrolysis reaction to form a covering film on the surface of the aluminum pigment.

The step of adding the 2% PS solution and the stirring at room temperature for 24 hours was repeated three times.

By doing so, an aluminum pigment dispersion B containing the aluminum pigment of which surface was provided with a covering film was obtained.

4.3 Example 3

The same procedure as in "4.2 Example 2" was performed, except that methyl ethyl ketone (hereinafter also referred to as "MEK") was used instead of the THF added to the 5% AL dispersion and that MEK was used instead of the THF added to the 20% PS solution.

By doing so, an aluminum pigment dispersion C containing the aluminum pigment of which surface was provided with a covering film was obtained.

4.4 Example 4

The same procedure as in "4.2 Example 2" was performed, except that the step of adding the 2% PS solution and the stirring at room temperature for 24 hours was repeated twice.

By doing so, an aluminum pigment dispersion D containing the aluminum pigment of which surface was provided with a covering film was obtained.

4.5 Example 5

The same procedure as in "4.3 Example 3" was performed, except that the step of adding the 2% PS solution and the stirring at room temperature for 24 hours was repeated twice.

By doing so, an aluminum pigment dispersion E containing the aluminum pigment of which surface was provided with a covering film was obtained.

4.6 Example 6

First, 20 g of a 5% AL dispersion prepared as in "4.1 Example 1" was put in a beaker, and 0.8 g of a 20% PS solution prepared as in "4.1 Example 1" was added thereto, followed by stirring at room temperature for 12 hours for a hydrolysis reaction to form a covering film on the surface of the aluminum pigment.

Then, 0.1 g of distilled water was added in the beaker, followed by stirring at room temperature for 12 hours for densifying the covering film.

Both the step of adding the 20% PS solution and stirring for 12 hours and the subsequent step of adding distilled water and stirring for 12 hours were each repeated three times.

By doing so, an aluminum pigment dispersion F containing the aluminum pigment of which surface was provided with a covering film was obtained.

4.7 Example 7

First, THF was added to a 5% AL dispersion prepared as in "4.1 Example 1", followed by stirring to prepare a 1.7% by mass aluminum pigment dispersion (hereinafter also referred to as "1.7% AL dispersion").

Then, THF was added to the 20% PS solution, followed by stirring to prepare a 2% PS solution.

Then, 60 g of the resulting 1.7% AL dispersion was put in a beaker, and 8 g of the 2% PS solution was added thereto, followed by stirring at room temperature for 6 hours for a hydrolysis reaction to form a covering film on the surface of the aluminum pigment.

Then, a mixture solution consisting of 2 g of distilled water and 18 g of THF was put in a beaker, and then the beaker was sealed. Subsequently, the sealed beaker was put in a polyethylene bag for further sealing. Then, the covering film was densified by stirring at room temperature for 18 hours. The polyethylene bag was used by substituting the gas inside the bag by Ar gas in advance and then putting silica gel therein.

Both the step of adding the 2% PS solution and stirring for 6 hours and the subsequent step of adding the mixture solution in the beaker and stirring for 18 hours were each repeated twice.

By doing so, an aluminum pigment dispersion G containing the aluminum pigment of which surface was provided with a covering film was obtained.

All the organic solvents used were those applied to dehydration by molecular sieve.

4.8 Example 8

The same procedure as in "4.7 Example 7" was performed, except that MEK was used instead of the THF added to the 5% AL dispersion and MEK was used instead of the THF added to the 20% PS solution. By doing so, an aluminum pigment dispersion H containing the aluminum pigment of which surface was provided with a covering film was obtained.

4.9 Comparative Example 1

The same procedure as in "4.1 Example 1" was performed, except that the addition amount of the 20% PS solution was 4 g. By doing so, an aluminum pigment dispersion I was obtained.

4.10 Comparative Example 2

First, the same procedure as in "4.1 Example 1" was performed, except that the addition amount of the 20% PS solution was 2.4 g and that the step of adding the 20% PS solution and stirring at room temperature for 24 hours was performed once. By doing so, an aluminum pigment dispersion J was obtained.

4.11 Comparative Example 3

First, 60 g of a 1.7% AL dispersion prepared as in "4.7 Example 7" was put in a beaker, and 24 g of a 2% PS solution prepared as in "4.2 Example 2" was added thereto, followed by stirring at room temperature for 24 hours for a hydrolysis reaction. By doing so, an aluminum pigment dispersion K was obtained.

4.12 Comparative Example 4

The same procedure as in "4.11 Comparative Example 3" was performed, except that MEK was used instead of the THF added to the 5% AL dispersion, that MEK was used instead of the THF added to the 20% PS solution, and that the addition amount of the 20% PS solution was 0.8 g. By doing so, an aluminum pigment dispersion L was obtained.

4.13 Comparative Example 5

The same procedure as in "4.11 Comparative Example 3" was performed, except that toluene was used instead of the THF added to the 5% AL dispersion, that toluene was used instead of the THF added to the 20% PS solution, and that the addition amount of the 20% PS solution was 0.8 g. By doing so, an aluminum pigment dispersion M was obtained.

4.14 Comparative Example 6

The same procedure as in "4.11 Comparative Example 3" was performed, except that hexane was used instead of the THF added to the 5% AL dispersion and that hexane was used instead of the THF added to the 20% PS solution. By doing so, an aluminum pigment dispersion N was obtained.

4.15 Comparative Example 7

The same procedure as in "4.2 Example 2" was performed, except that the step of adding the 2% PS solution and stirring at room temperature for 24 hours was performed once. By doing so, an aluminum pigment dispersion O was obtained.

4.16 Comparative Example 8

The same procedure as in "4.3 Example 3" was performed, except that the step of adding the 2% PS solution and stirring at room temperature for 24 hours was performed once. By doing so, an aluminum pigment dispersion P was obtained.

4.17 Comparative Example 9

The same procedure as in "4.10 Comparative Example 2" was performed, except that the stirring time after the addition of the 2% PS solution was 12 hours and then a step of adding 4 g of distilled water in the beaker and stirring at room temperature for 12 hours was additionally performed.

By doing so, an aluminum pigment dispersion Q was obtained.

4.18 Comparative Example 10

The same procedure as in "4.11 Comparative Example 3" was performed, except that the stirring time after the addition of the 2% PS solution was 6 hours. Then, a step of adding a mixture solution consisting of 1.3 g of distilled water and 12.7 g of THF in the beaker and stirring at room temperature for 24 hours was repeated three times.

The same procedure as in "4.11 Comparative Example 3" was performed excepting the above-mentioned changes.

By doing so, an aluminum pigment dispersion R was obtained.

4.19 Comparative Example 11

The same procedure as in "4.18 Comparative Example 10" was performed, except that MEK was used instead of the THF added to the 5% AL dispersion, that MEK was used instead of the THF added to the 20% PS solution, and that a mixture solution of distilled water and MEK was used instead of the mixture solution of distilled water and THF.

By doing so, an aluminum pigment dispersion S was obtained.

4.20 Comparative Example 12

The mixture solution consisting of 2 g of distilled water and 18 g of THF in "4.7 Example 7" was changed to a mixture solution consisting of 4 g of distilled water and 36 g of THF.

Furthermore, the step of adding a 2% PS solution and stirring for 6 hours and the subsequent step of adding a mixture solution of distilled water and THF and stirring at room temperature for 18 hours in "4.7 Example 7" were each performed once.

The same procedure as in "4.7 Example 7" was performed excepting the above-mentioned changes. By doing so, an aluminum pigment dispersion T was obtained.

4.21 Comparative Example 13

The same procedure as in "4.20 Comparative Example 12" was performed, except that MEK was used instead of the THF added to the 5% AL dispersion, that MEK was used instead of the THF added to the 20% PS solution, and that a mixture of distilled water and MEK was used instead of the mixture of distilled water and THF. By doing so, an aluminum pigment dispersion U containing the aluminum pigment of which surface was provided with a covering film was obtained.

4.22 Comparative Example 14

Twenty grams of a 5% AL dispersion prepared as in "4.1 Example 1" was put in a beaker, followed by stirring to give an aluminum pigment dispersion V.

4.23 Comparative Example 15

Sixty grams of a 1.7% AL dispersion prepared as in "4.7 Example 7" was put in a beaker, followed by stirring to give an aluminum pigment dispersion W.

4.24 Comparative Example 16

Sixty grams of a 1.7% AL dispersion prepared as in "4.8 Example 8" was put in a beaker, followed by stirring to give an aluminum pigment dispersion X.

4.25 Evaluation Test

4.25.1 Water Repellency Evaluation Test

Four grams of water was put in a sample bottle, and 1 g of any one of the resulting aluminum pigment dispersions A to X was added in the bottle, followed by stirring and then being left standing at a constant temperature of 25° C. The water repellency of the aluminum pigment dispersion was evaluated by visually observing changes with the passage of time. The evaluation criteria of water repellency of the aluminum pigment dispersion are as follows:

AA: excellent in water repellency (no particular change was observed even after 10 days);

A: good in water repellency (whitening was observed at the time after 8 days);

B: fair in water repellency (whitening was observed at the time after 5 days); and C: poor in water repellency (whitening was observed at the time after 2 days).

4.25.2 Dispersibility Evaluation Test

Any one of the aluminum pigment dispersions A to X prepared by the above-described processes was dropwise applied to a printing paper ("PM photograph (glossy) model No. KA450PSK", manufactured by Seiko Epson Corp.), followed by drying at room temperature for 1 day. The dispersibility of the aluminum pigment dispersion was evaluated by observing the resulting sample under a light microscope. The dispersibility of the aluminum pigment dispersion was evaluated on the basis of the degree of occurrence of aggregation and the size of the aggregation product. The evaluation criteria of dispersibility of the aluminum pigment dispersion are as follows:

AAA: excellent in dispersibility (no aggregation products are observed);

AA: very good in dispersibility (aggregation products are slightly observed);

A: good in dispersibility (black aggregation products are observed, and small clods are present);

B: fair in dispersibility (aggregation products are observed, and moderate clods are present); and C: poor in dispersibility (aggregation products are observed, and large clods are present).

4.25.3 Evaluation Result

Tables 1 and 2 show the results of the water repellency and dispersibility evaluation tests of the aluminum pigment dispersions A to X prepared in the above-described processes.

TABLE 1

| | | | Example 1<br>A | Example 2<br>B | Example 3<br>C | Example 4<br>D | Example 5<br>E | Example 6<br>F | Example 7<br>G | Example 8<br>H |
|---|---|---|---|---|---|---|---|---|---|---|
| Aluminum<br>pigment<br>dispersion | Aluminum pigment (g) | | 1.0 | 1.0 | 1.0 | 1.0 | 1.0 | 1.0 | 1.0 | 1.0 |
| | First<br>organic<br>solvent | DEGDEE (g) | 19 | 19 | 19 | 19 | 19 | 19 | 19 | 19 |
| | | THF (g) | | | 180 | | 180 | | 40 | |
| | | MEK (g) | | | | 180 | | 180 | | 40 |
| | | Toluene (g) | | | | | | | | |
| | | Hexane (g) | | | | | | | | |
| Polysilazane<br>solution | Polysilazane raw<br>material | Addition amount (g) | 0.16 | 0.16 | 0.16 | 0.16 | 0.16 | 0.16 | 0.16 | 0.16 |
| | | Frequency (times) | 3 | 3 | 3 | 2 | 2 | 3 | 2 | 2 |

TABLE 1-continued

|  |  |  |  | Example 1 A | Example 2 B | Example 3 C | Example 4 D | Example 5 E | Example 6 F | Example 7 G | Example 8 H |
|---|---|---|---|---|---|---|---|---|---|---|---|
|  | Second organic solvent | Xylene | Addition amount (g) | 0.64 | 0.64 | 0.64 | 0.64 | 0.64 | 0.64 | 0.64 | 0.64 |
|  |  |  | Frequency (times) | 3 | 3 | 3 | 2 | 2 | 3 | 2 | 2 |
|  |  | THF | Addition amount (g) |  | 7.2 |  | 7.2 |  |  | 7.2 |  |
|  |  |  | Frequency (times) |  | 3 |  | 2 |  |  | 2 |  |
|  |  | MEK | Addition amount (g) |  |  | 7.2 |  | 7.2 |  |  | 7.2 |
|  |  |  | Frequency (times) |  |  | 3 |  | 2 |  |  | 2 |
|  |  | Toluene | Addition amount (g) |  |  |  |  |  |  |  |  |
|  |  |  | Frequency (times) |  |  |  |  |  |  |  |  |
|  |  | Hexane | Addition amount (g) |  |  |  |  |  |  |  |  |
|  |  |  | Frequency (times) |  |  |  |  |  |  |  |  |
| Densified film-forming material | Distilled water |  | Addition amount (g) |  |  |  |  |  | 0.1 | 2.0 | 2.0 |
|  |  |  | Frequency (times) |  |  |  |  |  | 3 | 2 | 2 |
|  | Third organic solvent | THF | Addition amount (g) |  |  |  |  |  |  | 18 |  |
|  |  |  | Frequency (times) |  |  |  |  |  |  | 2 |  |
|  |  | MEK | Addition amount (g) |  |  |  |  |  |  |  | 18 |
|  |  |  | Frequency (times) |  |  |  |  |  |  |  | 2 |
| Addition procedure (Al: aluminum pigment dispersion, PS: polysilazane solution, water: densified film-forming material) |  |  |  | Al→PS→ PS→PS | Al→PS→ PS→PS | Al→PS→ PS→PS | Al→PS→ PS→PS | Al→PS→ PS | Al→PS→ PS | Al→PS→ water→PS →water→ PS→water | Al→PS→ water→PS →water | Al→PS→ water→PS →water |
| Evaluation result | Water repellency |  |  | AA | AA | AA | AA | AA | AA | AA | AA |
|  | Dispersibility |  |  | A | A | A | AA | A | A | AAA | AA |

TABLE 2

|  |  |  |  | Comparative Example 1 I | Comparative Example 2 J | Comparative Example 3 K | Comparative Example 4 L | Comparative Example 5 M | Comparative Example 6 N | Comparative Example 7 O | Comparative Example 8 P |
|---|---|---|---|---|---|---|---|---|---|---|---|
| Aluminum pigment dispersion | Aluminum pigment (g) |  |  | 1.0 | 1.0 | 1.0 | 1.0 | 1.0 | 1.0 | 1.0 | 1.0 |
|  | First organic solvent | DEGDEE (g) |  | 19 | 19 | 19 | 19 | 19 | 19 | 19 | 19 |
|  |  | THF (g) |  |  |  | 40 |  |  |  | 180 |  |
|  |  | MEK (g) |  |  |  |  | 40 |  |  |  | 180 |
|  |  | Toluene (g) |  |  |  |  |  | 40 |  |  |  |
|  |  | Hexane (g) |  |  |  |  |  |  | 40 |  |  |
| Polysilazane solution | Polysilazane raw material |  | Addition amount (g) | 0.80 | 0.48 | 0.48 | 0.16 | 0.16 |  | 0.16 | 0.16 |
|  |  |  | Frequency (times) | 3 | 1 | 1 | 1 | 1 |  | 1 | 1 |
|  | Second organic solvent | Xylene | Addition amount (g) | 3.20 | 1.92 | 1.92 | 0.64 | 0.64 |  | 0.64 | 0.64 |
|  |  |  | Frequency (times) | 3 | 1 | 1 | 1 | 1 |  | 1 | 1 |
|  |  | THF | Addition amount (g) |  |  | 21.6 |  |  |  | 7.2 |  |
|  |  |  | Frequency (times) |  |  | 1 |  |  |  | 1 |  |
|  |  | MEK | Addition amount (g) |  |  |  | 7.2 |  |  |  | 7.2 |
|  |  |  | Frequency (times) |  |  |  | 1 |  |  |  | 1 |
|  |  | Toluene | Addition amount (g) |  |  |  |  | 7.2 |  |  |  |
|  |  |  | Frequency (times) |  |  |  |  | 1 |  |  |  |
|  |  | Hexane | Addition amount (g) |  |  |  |  |  | 2 |  |  |
|  |  |  | Frequency (times) |  |  |  |  |  | 1 |  |  |
| Densified film-forming material | Distilled water |  | Addition amount (g) |  |  |  |  |  |  |  |  |
|  |  |  | Frequency (times) |  |  |  |  |  |  |  |  |
|  | Third organic solvent | THF | Addition amount (g) |  |  |  |  |  |  |  |  |
|  |  |  | Frequency (times) |  |  |  |  |  |  |  |  |
|  |  | MEK | Addition amount (g) |  |  |  |  |  |  |  |  |
|  |  |  | Frequency (times) |  |  |  |  |  |  |  |  |
| Addition procedure (Al: aluminum pigment dispersion, PS: polysilazane solution, water: densified film-forming material) |  |  |  | Al→PS→PS →PS | Al→PS | Al→PS | Al→PS | Al→PS | Al→PS | Al→PS | Al→PS |
| Evaluation result | Water repellency |  |  | AA | AA | AA | B | C | C | B | B |
|  | Dispersibility |  |  | B | B | B | A | C | C | AAA | AA |

|  |  |  |  | Comparative Example 9 Q | Comparative Example 10 R | Comparative Example 11 S | Comparative Example 12 T | Comparative Example 13 U | Comparative Example 14 V | Comparative Example 15 W | Comparative Example 16 X |
|---|---|---|---|---|---|---|---|---|---|---|---|
| Aluminum pigment dispersion | Aluminum pigment (g) |  |  | 1.0 | 1.0 | 1.0 | 1.0 | 1.0 | 1.0 | 1.0 | 1.0 |
|  | First organic solvent | DEGDEE (g) |  | 19 | 19 | 19 | 19 | 19 | 19 | 19 | 19 |
|  |  | THF (g) |  |  | 40 |  | 40 |  | 40 |  | 40 |
|  |  | MEK (g) |  |  |  | 40 |  | 40 |  | 40 |  |
|  |  | Toluene (g) |  |  |  |  |  |  |  |  |  |
|  |  | Hexane (g) |  |  |  |  |  |  |  |  |  |

TABLE 2-continued

| | | | | | | | | | | | |
|---|---|---|---|---|---|---|---|---|---|---|---|
| Polysilazane solution | Polysilazane raw material | | Addition amount (g) | 0.48 | 0.48 | 0.48 | 0.16 | 0.16 | | | |
| | | | Frequency (times) | 1 | 1 | 1 | 1 | 1 | | | |
| | Second organic solvent | Xylene | Addition amount (g) | 1.92 | 1.92 | 1.92 | 0.64 | 0.64 | | | |
| | | | Frequency (times) | 1 | 1 | 1 | 1 | 1 | | | |
| | | THF | Addition amount (g) | | 21.6 | | 7.2 | | | | |
| | | | Frequency (times) | | 1 | | 1 | | | | |
| | | MEK | Addition amount (g) | | | 5.4 | | 7.2 | | | |
| | | | Frequency (times) | | | 1 | | 1 | | | |
| | | Toluene | Addition amount (g) | | | | | | | | |
| | | | Frequency (times) | | | | | | | | |
| | | Hexane | Addition amount (g) | | | | | | | | |
| | | | Frequency (times) | | | | | | | | |
| Densified film-forming material | Distilled water | | Addition amount (g) | 4.0 | 1.3 | 1.3 | 4.0 | 4.0 | | | |
| | | | Frequency (times) | 1 | 3 | 3 | 1 | 1 | | | |
| | Third organic solvent | THF | Addition amount (g) | | 12.7 | | 36.0 | | | | |
| | | | Frequency (times) | | 3 | | 1 | | | | |
| | | MEK | Addition amount (g) | | | 12.7 | | 36.0 | | | |
| | | | Frequency (times) | | | 3 | | 1 | | | |
| Addition procedure (Al: aluminum pigment dispersion, PS: polysilazane solution, water: densified film-forming material) | | | | Al→PS→ water | Al→PS→ water→ water→ water | Al→PS→ water→ water→ water | Al→PS→ water | Al→PS→ water | Al | Al | Al |
| Evaluation result | | | Water repellency | AA | AA | C | C | C | C | C | C |
| | | | Dispersibility | B | B | C | AAA | AA | AAA | AAA | AAA |

In any of the aluminum pigment dispersions prepared by the production methods according to Examples 1 to 8, the amount of the polysilazane is adjusted such that the amount in the reaction system for forming the covering film is 0.4 parts by mass or less based on 1 part by mass of the aluminum pigment, and the total addition amount of the polysilazane is from 0.2 to 0.6 parts by mass based on 1 part by mass of the aluminum pigment. Therefore, the results in Table 1 show that the aluminum pigment dispersions prepared such methods are satisfactory in water repellency and dispersibility.

In the aluminum pigment dispersion prepared by the production method according to Comparative Example 1, the amount of the polysilazane in the reaction system for forming the covering film is larger than 0.4 parts by mass based on 1 part by mass of the aluminum pigment. In addition, the total addition amount of the polysilazane is larger than 0.6 parts by mass based on 1 part by mass of the aluminum pigment. As a result, in the dispersibility evaluation test, aggregation products having moderate clods were observed, and the resulting water-repellent treated aluminum pigment dispersion was thus not satisfactory.

In the aluminum pigment dispersions prepared by the production methods according to Comparative Examples 2 and 3, the addition amount of the polysilazane in each reaction system for forming the covering film is larger than 0.4 parts by mass based on 1 part by mass of the aluminum pigment. As a result, in the dispersibility evaluation test, aggregation products having moderate clods were observed, and the resulting water-repellent treated aluminum pigment dispersions were thus not satisfactory.

In the aluminum pigment dispersion prepared by the production method according to Comparative Example 4, the total addition amount of the polysilazane is smaller than 0.2 parts by mass based on 1 part by mass of the aluminum pigment. As a result, in the water repellency evaluation test, the water repellency was fair, and the resulting water-repellent treated aluminum pigment dispersion was thus not satisfactory.

In the aluminum pigment dispersion prepared by the production method according to Comparative Example 5, the total addition amount of the polysilazane is smaller than 0.2 parts by mass based on 1 part by mass of the aluminum pigment. As a result, in the water repellency evaluation test, the water repellency was fair. In addition, in the dispersibility evaluation test, aggregation products having large clods were observed. Thus, the resulting water-repellent treated aluminum pigment dispersion was not satisfactory.

In the aluminum pigment dispersion prepared by the production method according to Comparative Example 6, the step of adding the polysilazane is not performed. As a result, the water repellency was poor, and the resulting water-repellent treated aluminum pigment dispersion was thus not satisfactory. In addition, in the dispersibility evaluation test, aggregation products having large clods were observed. Thus, the resulting water-repellent treated aluminum pigment dispersion was not satisfactory.

In the aluminum pigment dispersions prepared by the production methods according to Comparative Examples 7 and 8, the total addition amount of the polysilazane is smaller than 0.2 parts by mass based on 1 part by mass of the aluminum pigment. As a result, in the water repellency evaluation test, the water repellency was fair, and the resulting satisfactory water-repellent treated aluminum pigment dispersions were thus not satisfactory.

In the aluminum pigment dispersions prepared by the production methods according to Comparative Examples 9 and 10, the amount of the polysilazane in the reaction system for forming the covering film is larger than 0.4 parts by mass based on 1 part by mass of the aluminum pigment. As a result, in the dispersibility evaluation test, aggregates having moderate clods were observed, and the resulting water-repellent treated aluminum pigment dispersions were thus not satisfactory.

In the aluminum pigment dispersion prepared by the production method according to Comparative Example 11, the amount of the polysilazane in the reaction system for forming the covering film is larger than 0.4 parts by mass based on 1 part by mass of the aluminum pigment. As a result, in the dispersibility evaluation test, aggregation products having large clods were observed. In addition, in the water repellency evaluation test, the water repellency was poor. Thus, the resulting water-repellent treated aluminum pigment dispersion was not satisfactory.

In the aluminum pigment dispersions prepared by the production methods according to Comparative Examples 12 and 13, the total addition amount of the polysilazane is smaller than 0.2 parts by mass based on 1 part by mass of the aluminum pigment. As a result, in the water repellency evaluation test, the water repellency was poor, and the resulting water-repellent treated aluminum pigment dispersions were thus not satisfactory.

In the aluminum pigment dispersions prepared by the production methods according to Comparative Examples 14 to 16, the step of adding the polysilazane is not performed. Therefore, the water repellency was poor, and the resulting water-repellent treated aluminum pigment dispersions were thus not satisfactory.

What is claimed is:

1. An aqueous ink composition comprising a water-repellent treated aluminum pigment, wherein the water-repellent treated aluminum pigment is a covering film containing at least Si and is formed on the surface of an aluminum pigment having an average thickness of from 5 to 30 nm and a 50% mean particle diameter of from 0.5 to 3 μm, wherein the coverage ratio of the aluminum pigment surface by the covering film is from 20 to 90% when it is calculated from the composition ratios of C, O, Al, and Si that are detected by XPS measurement at an incident angle of 30°.

2. The aqueous ink composition according to claim 1, wherein the covering film has a thickness of from 0.5 to 10 nm.

* * * * *